(12) United States Patent
Foster et al.

(10) Patent No.: US 7,092,527 B2
(45) Date of Patent: Aug. 15, 2006

(54) METHOD, SYSTEM AND PROGRAM PRODUCT FOR MANAGING A SIZE OF A KEY MANAGEMENT BLOCK DURING CONTENT DISTRIBUTION

(75) Inventors: Eric M. Foster, Owego, NY (US); Jeffrey B. Lotspiech, San Jose, CA (US); Florian Pestoni, Mountain View, CA (US); Wilfred E. Plouffe, Jr., San Jose, CA (US); Frank A. Schaffa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 874 days.

(21) Appl. No.: 10/125,254

(22) Filed: Apr. 18, 2002

(65) Prior Publication Data

US 2003/0198350 A1  Oct. 23, 2003

(51) Int. Cl.
*H04L 9/00* (2006.01)
(52) U.S. Cl. .................................... 380/277; 380/273
(58) Field of Classification Search ................ 380/273, 380/277, 28
See application file for complete search history.

(56) References Cited

U.S. PATENT DOCUMENTS

| | | | |
|---|---|---|---|
| 4,736,422 A | 4/1988 | Mason | |
| 5,093,860 A | 3/1992 | Steinbrenner et al. | |
| 5,173,938 A | 12/1992 | Steinbrenner et al. | |
| 5,375,169 A | 12/1994 | Seheidt et al. | |
| 5,410,602 A | 4/1995 | Finkelstein et al. | |
| 5,592,552 A | 1/1997 | Fiat | |
| 5,712,800 A | 1/1998 | Aucsmith | |
| 5,787,173 A | 7/1998 | Seheidt et al. | |
| 5,812,666 A | 9/1998 | Baker et al. | |
| 5,894,516 A | 4/1999 | Brandenburg | |
| 6,047,072 A | 4/2000 | Field et al. | |
| 6,097,816 A | 8/2000 | Momiki et al. | |
| 6,118,873 A | 9/2000 | Lotspiech et al. | |
| 6,240,188 B1 | 5/2001 | Dondeti et al. | |
| 6,330,671 B1 | 12/2001 | Aziz | |
| 2001/0021255 A1* | 9/2001 | Ishibashi | 380/277 |
| 2002/0085715 A1* | 7/2002 | Ripley | 380/202 |
| 2002/0087871 A1* | 7/2002 | Ripley | 713/193 |

(Continued)

FOREIGN PATENT DOCUMENTS

EP  0197392 A2  3/1987

(Continued)

OTHER PUBLICATIONS

RPS920010134, "Transmitting a Broadcast Via the Internet Within A Limited Distribution Base of Listeners", Inventor: Dave Challener, Dated: Dec. 2001, 1 page.

(Continued)

*Primary Examiner*—Jacques H. Louis-Jacques
*Assistant Examiner*—Jacob Lipman
(74) *Attorney, Agent, or Firm*—William H. Steinberg; Hoffman, Warnick & D'Alessandro LLC

(57) ABSTRACT

A method, system and program product for managing a size of a key management block (KMB) during content distribution is provided. Specifically, a first KMB corresponding to a first subtree of devices is received along with content as encrypted with a title key. If a size of the first KMB exceeds a predetermined threshold, a second subtree will be created. A second KMB corresponding to the second subtree of devices will then be generated. The second KMB contains an entry revoking the entire first subtree of devices and, as such, is smaller than the first KMD. Any compliant devices from the first subtree are migrated to the second subtree.

20 Claims, 9 Drawing Sheets

U.S. PATENT DOCUMENTS

2002/0104001 A1 * 8/2002 Lotspiech et al. .......... 713/163

FOREIGN PATENT DOCUMENTS

| JP | 10-070530 | 3/1998 |
| JP | 11-167538 | 6/1999 |
| JP | 11215115 A | 8/1999 |
| JP | 2001186119 A | 7/2001 |
| JP | 2002-077131 | 3/2002 |
| JP | 2002-108811 | 4/2002 |
| JP | 2003-204321 | 7/2003 |
| JP | 2003-273862 | 9/2003 |

OTHER PUBLICATIONS

IBM Technical Disclosure Bulletin "Data Encryption Algorithm Key Distribution Via Public Key Algorithm", vol. 28, No. 3, Dated: Aug. 1985, pp. 1065-1069.

6743379, INSPEC Abstract No.: C2000-12-6130S-022, "Secure Digital Content Control and Distribution Through the Internet", Authors: Changsheng Xu and Jiankang Wu, 2 pages, Dated: 2000.

* cited by examiner

METHOD, SYSTEM AND PROGRAM PRODUCT FOR MANAGING A SIZE OF A KEY MANAGEMENT BLOCK DURING CONTENT DISTRIBUTION

BACKGROUND OF THE INVENTION

1. Field of the Invention

In general, the present invention provides a method, system and program product for managing a size of a key management block (KMB) during content distribution. Specifically, the present invention provides replacement of a KMB corresponding to a first subtree of devices with a smaller KMB corresponding to a second subtree of devices.

2. Background Art

In the distribution of digital content, content such as video and audio data is typically transmitted from a content source to a content recipient. In one common implementation, content is prepared and encrypted by a content owner (e.g., a cable television network), and then delivered to a content service provider (e.g., a cable service provider). The service provider will then deliver the encrypted content to subscribing customers. An emerging technology in the field of content distribution is known as broadcast encryption, which is where encrypted content and all information necessary to access the content are delivered via one-way communication. That is, the recipient need not hold follow-up communications with the source. In this technology, the content is encrypted with a title key, which itself is encrypted with a key encrypting key. The key encrypting key is stored in a protected form within a key management block (KMB) that is transmitted with the content. Compliant receiver devices (e.g., set-top boxes, DVD players, etc.) will be able to process the KMB to recover the key encrypting key so that the title key can be decrypted and the content accessed.

In general, the KMB includes a protected transformation of the key encrypting key that can only be decrypted with device keys from compliant receiver devices. To this extent, the key encrypting key can take many forms within the KMB. For example, the key encrypting key can be encrypted multiple times (i.e., once for each set of valid device keys). In addition, the KMB includes entries of revoked devices. Specifically, if a receiver device was determined to be non-compliant or a circumvention device, an entry would be generated in the KMB revoking the device. This entry would prevent the revoked device from being able to recover the key encrypting key.

Problems arise, however, when the size of a KMB grows. In particular, in commonly used methods such as the Naor-Naor-Lotspiech tree algorithm, each time a device is revoked, it is placed into a revocation entry in the KMB (each entry could revoke more than one device). As the number of revocation entries increase, the size of the KMB is increased. Since the KMB must be transmitted and processed to recover the key encrypting key, the larger the KMB, the longer it will take to access the content. To this extent, the time period from when the receiver device begins receiving content to when the content can be decrypted is known as acquisition time (e.g., the time period from when the TV channel is changed until when the picture is displayed). Thus, as the KMB becomes larger, the acquisition time increases, which can cause great frustration to a consumer.

Previous attempts to reduce the acquisition time involved increasing the bandwidth allocated to transmission of a KMB. However, as known in the art, larger bandwidth comes at a premium. Although, the Naor-Naor-Lotspiech tree algorithm referenced above helps reduce the bandwidth requirement (i.e., only 12 bytes per revocation are required), significant space within the KMB can still be occupied by revoked devices.

Accordingly, there exists a need for a method, system and program product for managing a size of a KMB. Specifically, a need exists for determining when a size of a first KMB corresponding to a first subtree of devices exceeds a predetermined threshold. A further need exists for a second smaller KMB to be implemented when the predetermined threshold is reached. Still yet, a need exists for compliant devices to be migrated from the first subtree to the second subtree.

SUMMARY OF THE INVENTION

The present invention provides a method, system and program product for managing a size of a key management block (KMB) when the KMB is of the form referred to in the art as a logical key hierarchy (LKH). Specifically, under the present invention, a first KMB corresponding to a first substructure (e.g., a first subtree) will be received along with content that has been encrypted with a title key. The title key itself has been encrypted with a key encrypting key that is recoverable from the first KMB. When a size of the first KMB exceeds a predetermined threshold, a second substructure (e.g., a second subtree) will be created. Then, a second KMB corresponding to the second substructure will be generated. The second KMB includes an entry that revokes the first subtree. Since a single entry is sufficient to revoke the entire first substructure, the resulting KMB is substantially reduced in size. Based on migration data, all compliant devices will then be migrated from the first substructure to the second substructure. Migration can be performed in numerous ways. In a typical embodiment, migration includes mapping the compliant devices from the first subtree to the second substructure, and transmitting updated device key information to the compliant devices. Devices that were revoked in the first substructure are not migrated and are thus excluded from computing the correct key encrypting key.

According to a first aspect of the present invention, a method for managing a size of a key management block (KMB) during content distribution is provided. The method comprises the steps of: (1) providing a first KMB corresponding to a first substructure, and content encrypted with a title key; (2) determining whether a size of the first KMB exceeds a predetermined threshold; (3) providing a second KMB corresponding to a second substructure, wherein the second KMB includes an entry revoking the first substructure; and (4) migrating compliant devices from the first substructure to the second substructure.

According to a second aspect of the present invention, a method for managing a size of a key management block (KMB) during content distribution is provided. The method comprises the steps of: (1) providing a first KMB corresponding to a first subtree of devices, and content encrypted with a title key, wherein the title key is encrypted with a first key encrypting key that is protected within the first KMB; (2) determining whether a size of the first KMB exceeds a predetermined threshold; (3) providing a second KMB corresponding to a second subtree of devices, wherein the second KMB includes an entry revoking the first subtree of devices, and wherein the second KMB is smaller than the first KMB; (4) migrating compliant devices from the first subtree of devices to the second subtree of devices; and (5)

re-encrypting the title key with a second key encrypting key as recovered from the second KMB.

According to a third aspect of the present invention, a system for managing a size of a key management block (KMB) during content distribution is provided. The system comprises: (1) a system for receiving a first KMB corresponding to a first subtree of devices, and content encrypted with a title key; (2) a system for receiving a second KMB corresponding to a second subtree of devices, wherein the second KMB is smaller than the first KMB, and wherein the second KMB includes an entry revoking the first subtree of devices; and (3) a system for migrating compliant devices from the first subtree of devices to the second subtree of devices based on migration data.

According to a fourth aspect of the present invention, a program product for managing a size of a key management block (KMB) during content distribution is provided. When executed, the program product comprises: (1) program code for receiving a first KMB corresponding to a first subtree of devices, and content encrypted with a title key; (2) program code for receiving a second KMB corresponding to a second subtree of devices, wherein the second KMB is smaller than the first KMB, and wherein the second KMB includes an entry revoking the first subtree of devices; and (3) program code for migrating compliant devices from the first subtree of devices to the second subtree of devices based on migration data.

According to a fifth aspect of the present invention, a method for re-encrypting a title key is provided. The method comprises the steps of: (1) providing a title key encrypted with a first key encrypting key; (2) processing a first KMB corresponding to a first subtree to recover the first key encrypting key; (3) decrypting the title key with the first key encrypting key; (4) processing a second KMB corresponding to a second subtree to recover a second key encrypting key; and (5) re-encrypting the title key with the second key encrypting key.

Therefore, the present invention provides a method, system and program product for managing a size of a key management block (KMB) during content distribution.

BRIEF DESCRIPTION OF THE DRAWINGS

These and other features of this invention will be more readily understood from the following detailed description of the various aspects of the invention taken in conjunction with the accompanying drawings in which.

Figure 1:
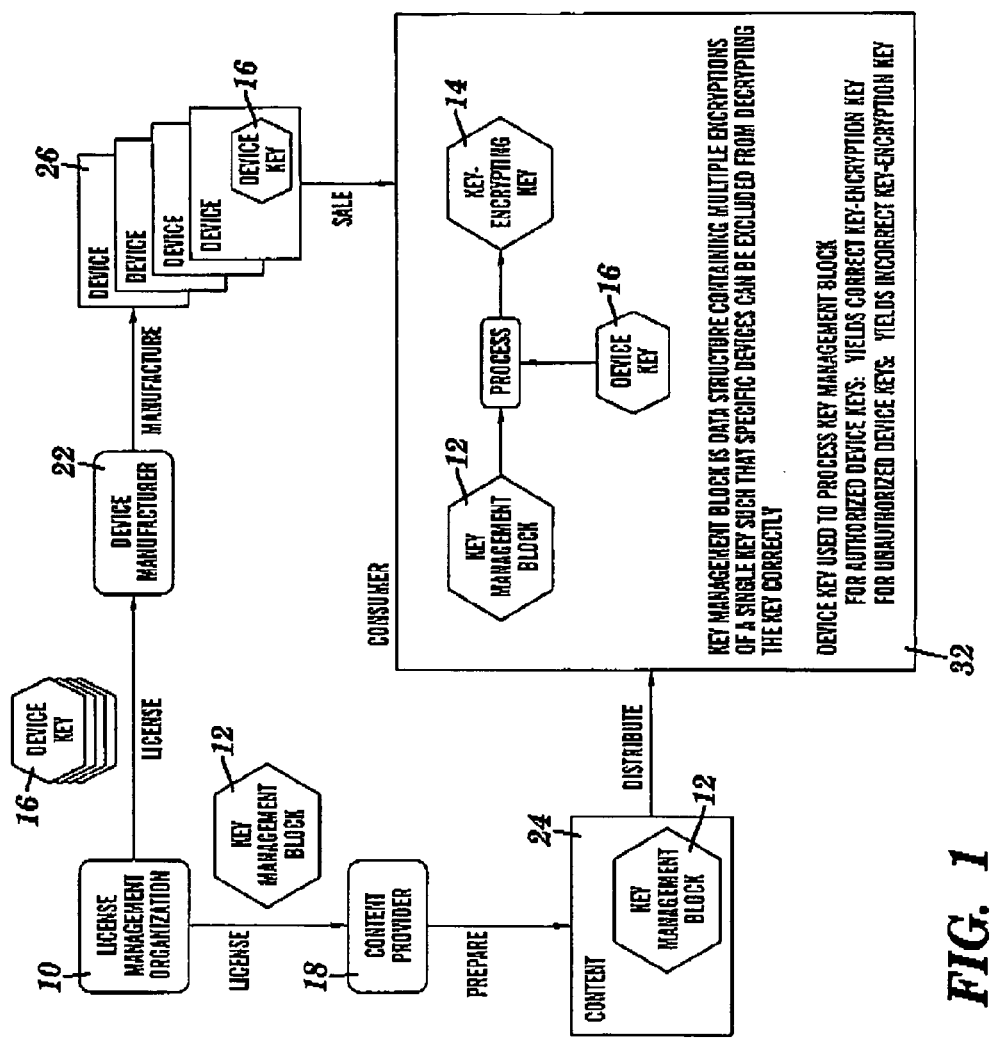
FIG. 1 depicts a flow diagram showing delivery of a key management block (KMB).

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For clarity, the Detailed Description of the Invention will have the following sections:
I. Definitions; and
II. Detailed Description.

I. DEFINITIONS

As used herein, the following terms shall have the following definitions:

Content—any data such as digital image or sound data deliverable from a source to a recipient.

Content Owner—an entity, such as a movie studio, that owns content.

Content Service Provider—an entity, such as a cable service provider, that provides the "pipeline" through which content is delivered from a content owner to a consumer.

Consumer Home Network—a series of interconnected consumer devices implemented such that the interconnected devices can share content.

Device—a consumer receiver device, such as a set-top box, a DVD player, etc., that receives content directly from a content owner, from a content service or from another device within a consumer home network.

Recipient—any entity, such as a content service provider or a device, capable of receiving transmissions under the present invention.

Source—any entity, such as a content owner, a content service provider or a device (in a consumer home network), capable of sending transmissions under the present invention.

Title Key—a key used to encrypt content.

Content Usage Conditions—guidelines such as copy controls, etc., governing the use and/or exploitation of content.

Key Encrypting Key—a key that is used to encrypt a title key or a title key-content usage condition combination.

Key Management Block (KMB)—a data structure that includes a key encrypting key in a protected form. A KMB is also referred to in the art as a session key block, a media key block, a key media block and/or a management key block.

Device Key (Set)—a (set of) key(s) assigned to a consumer device that is used to recover a key encrypting key from a KMB.

II. DETAILED DESCRIPTION

In general, the present invention provides a method, system and program product for managing a size-of a key management block (KMB). As indicated above, a KMB typically includes a protected "version" of a key encrypting key as well as entries of revoked devices. As the quantity of revocation entries grows, the size of the KMB will grow as well. Since compliant devices must receive and process the KMB to decrypt and access content, the size of the KMB affects both the time it takes to transmit the KMB as well as the time it takes to process the KMB. Accordingly, by maintaining the KMB at or below a certain size, improved service will be provided to consumers.

As will be further discussed below, the present invention manages the size of the KMB by drawing all devices (both compliant and revoked) from a subtree of devices (or some other substructure that is capable of being revoked with a single entry when a subsequent substructure is created). The subtree (or substructure) comprises nodes or leaves that each correspond to a particular device. When a quantity of revoked devices on a first subtree exceeds a predetermined threshold (e.g., 1000), or when a size of a KMB corresponding to the first subtree exceeds a predetermined threshold (e.g., 10,000 bytes), a second subtree will be started. The second subtree will include all new devices (compliant and revoked), as well as compliant devices migrated from the first (now defunct) subtree. Any KMBs corresponding to the second subtree will include a single entry that revokes the entire first subtree (i.e., all devices thereon).

Accordingly, because they will not contain individual revocations of devices from the first subtree, the KMBs corresponding to the second subtree will be smaller in size.

It should be understood that the decision to use KMBs corresponding to the second subtree is generally made by a content service provider. As such a service provider may elect to continue using the larger KMBs corresponding to the first subtree.

Referring now to FIG. 1, a flow diagram showing delivery of KMB 12 is depicted. As shown, an independent entity such as license management organization 10 develops KMB 12. As indicated above, KMB 12 is a data structure that includes a protected version (e.g., multiple encryptions of) key encrypting key 14 and entries of revoked devices. Device keys 16 are used in conjunction with KMB 12 to determine key encrypting key 14, which is used to encrypt/decrypt a title key and/or content usage conditions (as will be farther described in detail below). Specifically, once developed by license management organization 10, KMB 12 is distributed to content owner 18, who will prepare and encrypt content 24 with a title key. The title key will then be encrypted with key encrypting key 14. Content owner 18 will then deliver the encrypted content 24 to consumer 32 (or to a content service provider who will deliver the same to consumer 32) along with KMB 12. License management organization 10 also delivers valid device keys 16 to device manufacturer 22 who will then deliver (i.e., sell) compliant devices 26 containing the valid device keys 16 to consumer 32. Consumer 32 can then use device keys 16 in their purchased device 26 to process KMB 12 to recover key encrypting key 14, which will be used to decrypt the title key. If the device key used by consumer 32 is not authentic or was revoked in KMB 12, the correct key encrypting key 14 will not be recovered. A non-compliant device is one that has been identified as a circumvention or revoked device that would allow content to be illegally or improperly exploited. Thus, KMB 12 and device keys 16 help prevent content from being misused.

Figure 2:
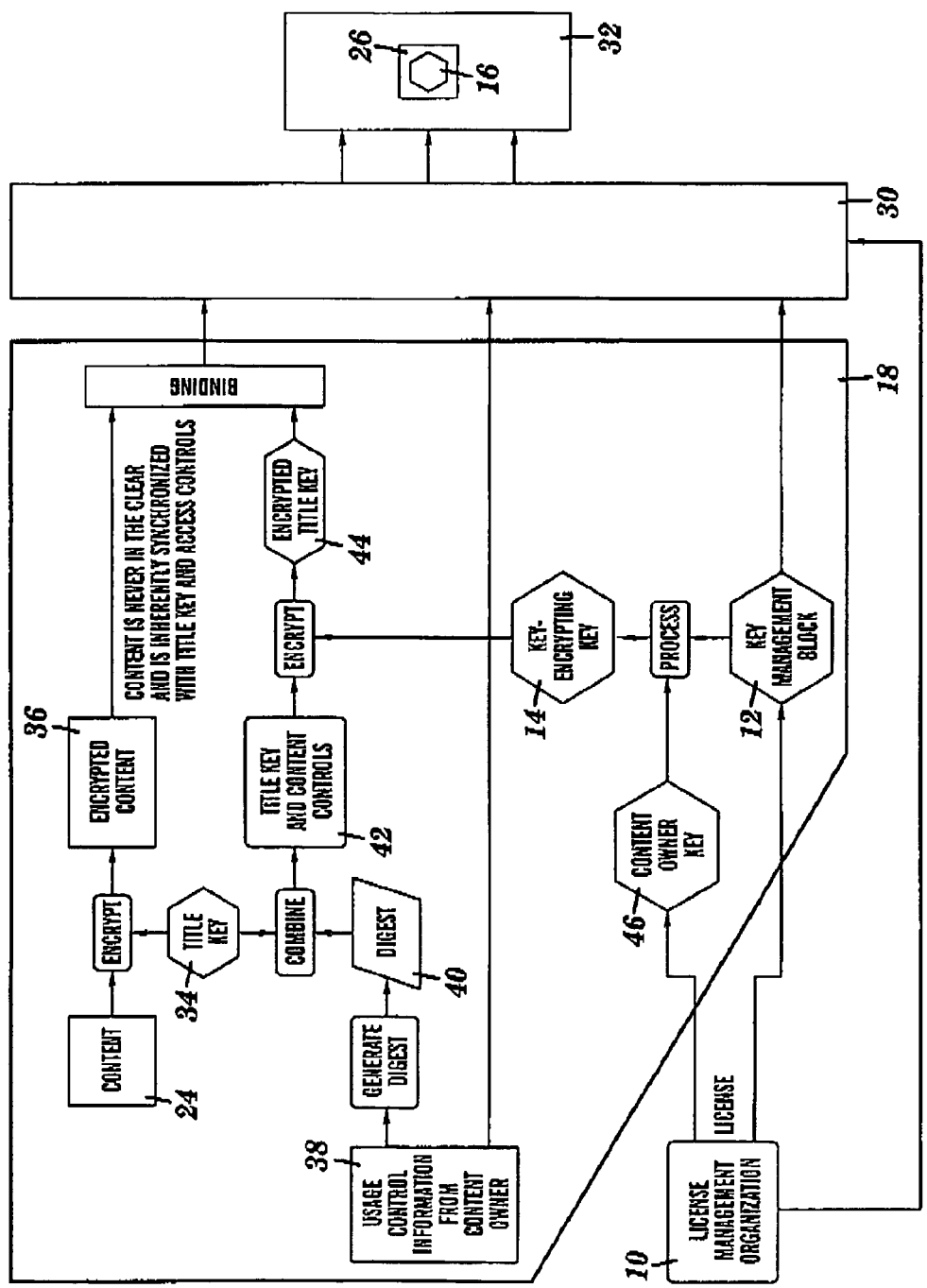
FIG. 2 depicts a flow diagram of a content owner encrypting content for transmission to a content service provider.

Referring now to FIG. 2, the encryption and delivery of content 24 and KMB 12 to content service provider 30 and consumer 32 are shown in greater detail. As depicted, content owner 18 will receive KMB 12 and content owner keys 46 from license management organization 10. Content owner 18 will then process KMB 12 with content owner keys 46 to recover key encrypting key 14. As further shown, content owner 18 will encrypt content 24 with title key 34. Once content 24 has been encrypted, title key 34 itself is encrypted with key encrypting key 14. Optionally, content owner 18 can provide content usage conditions 38. If provided, such conditions can be compressed into a digest 40 and combined with title key 34 (e.g., via a XOR operation). The resulting combination 42 (e.g., also known as a message authorization code or a MAC) can then be encrypted with key encrypting key 14 to yield encrypted combination 44. Content usage conditions 38 can be any controls placed on content 24 such as copy controls.

Encrypted content 36 can then be optionally bound to encrypted combination 44 (or encrypted title key) for transmission, along with KMB 12 and unencrypted content usage conditions 38 (if provided), to content service provider 30. It should be understood that the designation of content usage conditions 38 and its subsequent compression into a digest 40 and combination with title key 34 for encryption by key encrypting key 14 is optional under the present invention. Accordingly, it should be appreciated that title key 34 alone can be encrypted and optionally bound to encrypted content 36 for transmission.

Figure 3:
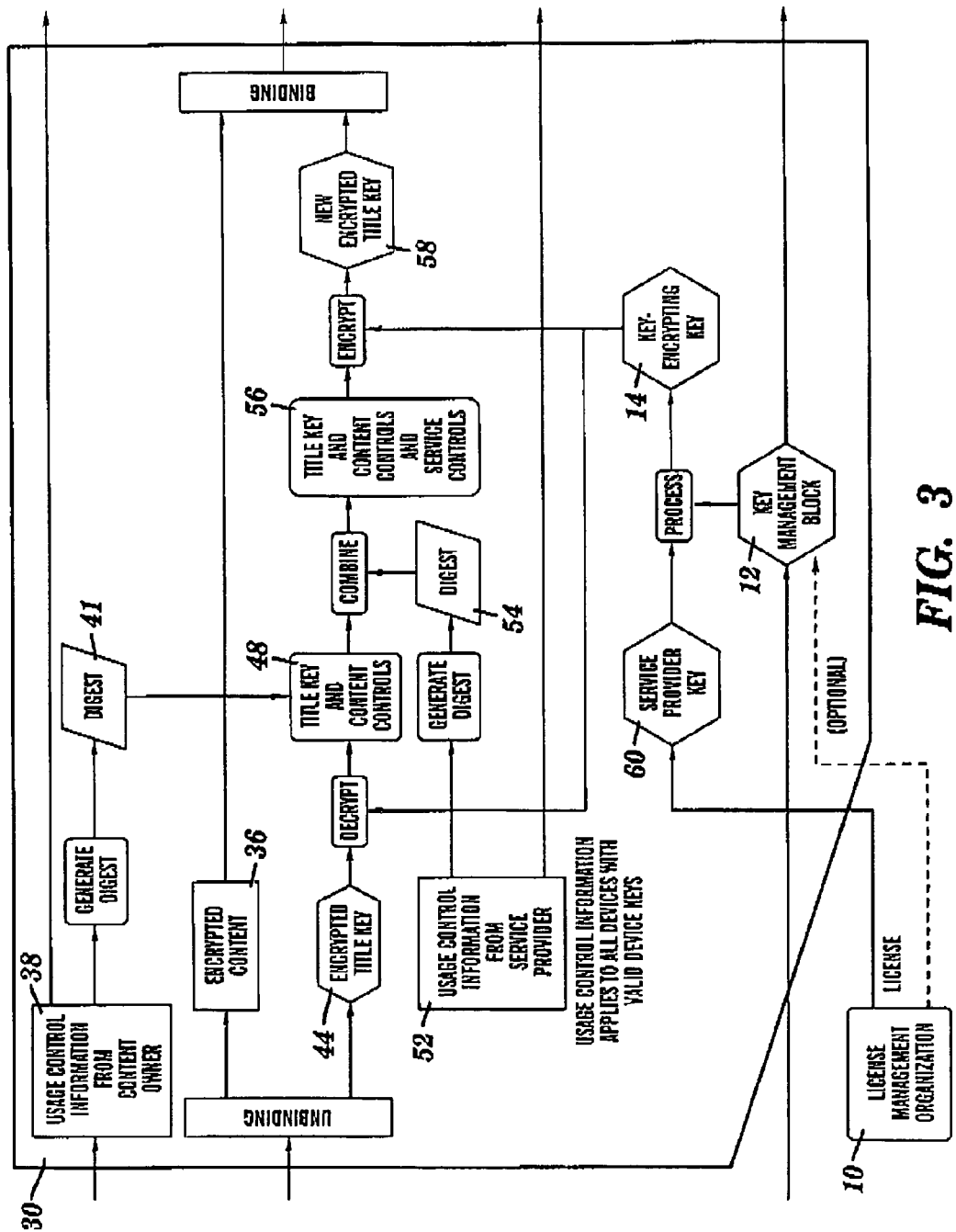
FIG. 3 depicts a flow diagram of a service provider receiving the transmission of FIG. 2 from the content owner.

Referring now to FIG. 3, receipt of the transmission of FIG. 2 from content owner 18 is shown in greater detail. Upon receipt, service provider 30 could perform numerous options including, among other things: (1) forwarding the communication to consumer 32 as is; (2) re-encrypting the title key with a new key encrypting key; and/or (3) verify and/or modifying content usage conditions. As depicted in FIG. 3, service provider 30 will receive and unbind encrypted content 36 from encrypted combination 44. By processing KMB 12 with service provider key 60 as received from license management organization 10, key encrypting key 14 can be recovered and used to decrypt encrypted combination 44. Once decrypted combination 48 has been yielded, service provider 30 can recover title key 34 (FIG. 2) and/or modify content usage conditions. In the case of the former, title key 34 can be recovered by using content usage conditions 38 to create digest 41. Once created, digest 41 will be used to separate out content usage conditions as digested in decrypted combination 48. At this time, content usage conditions 38 can be verified by comparing created digest 41 to the digest 40 (FIG. 2) in decrypted combination 48. In the case of the latter, any modifications to existing content usage conditions and/or additions of new content usage conditions will be provided as service provider content usage conditions 52. Such conditions 52 will be compressed into a digest 54 and added to combination 48 to yield combination 56. This combination 56 will then be encrypted with key encrypting key 14 to yield new encrypted combination 58. Encrypted combination 58 is then optionally bound to encrypted content 36 and transmitted to a consumer along with KMB 12, unencrypted owner content usage conditions 38 and unencrypted service provider content usage conditions 52.

It should be understood that the processing shown and described in conjunction with FIG. 3 is optional, and is included herein for illustrative purposes only. Specifically, service provider 30 could simply forward the transmission to subscribing consumers without recovering title key 34 and/or modifying content usage conditions. Moreover, as indicated above, the implementation of content usage conditions as shown in FIGS. 2–3 is not intended to be a limiting part of the present invention. Specifically, title key 34 could have been encrypted alone (i.e., without combination with digests 40 and 54). In such an event, creation of digests to recover title key 34 would be unnecessary.

Figure 4:
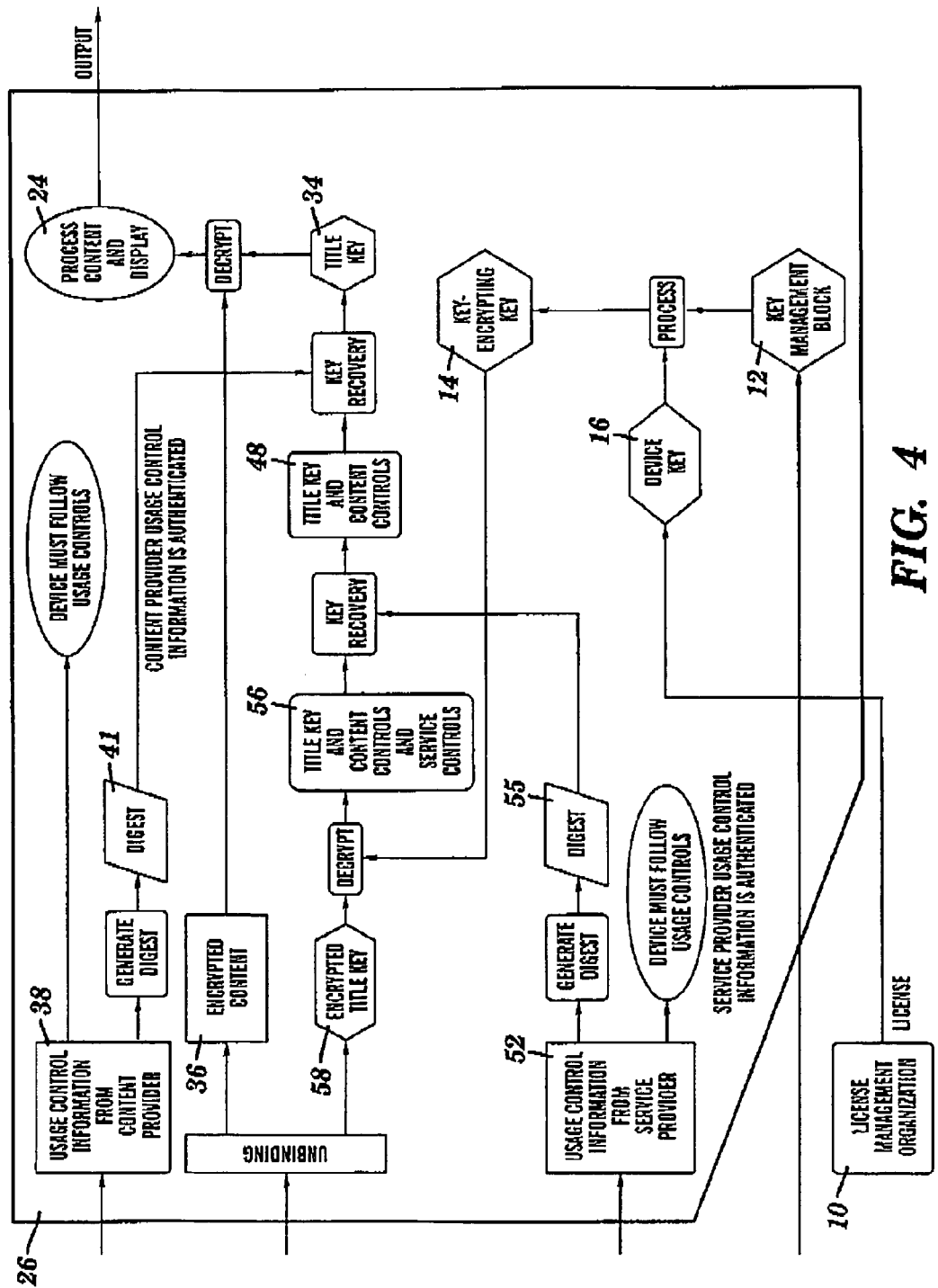
FIG. 4 depicts a flow diagram of a receiver receiving the transmission of FIG. 3 from the service provider.

Referring now to FIG. 4, receipt of the transmission of FIG. 3 by consumer device 26 is shown in greater detail. Device 26 is intended to be exemplary of any consumer device capable of receiving digital content. Such devices could include, among other things, a set-top box for receiving cable television signals, a DVD player, a television, a personal computer, etc. As depicted, device 26 will receive and separate encrypted content 36 from encrypted combination 58. Then, using key encrypting key 14, encrypted combination 58 will be decrypted to yield combination 56. Key encrypting key 14 is recovered by processing KMB 12 with device key 16. As described above in conjunction with FIG. 1, device key 16 is provided by license management organization 10 to device manufacturers and allows device 26 to recover key encrypting key 14 contained in KMB 12. Moreover, as described above, KMB 12 revokes devices deemed non-compliant in the sense that they cannot calculate the correct key encryption key 14. That is, if a device has been identified as a circumvention or a revoked device, its device keys cannot calculate the correct key encryption key 14 protected within in KMB 12. Thus, the non-compliant device will not be able to recover the title key 34 and cannot access content 24.

Once decrypted combination 56 is revealed, device 26 will verify the integrity of and/or "separate out" service provider content usage conditions 52 to recover title key 34. In the case of the former, verification can be performed as described above in conjunction with FIG. 3. Specifically, digest 55, based on service provider usage conditions 52, is created and compared to service provider usage conditions as digested 54 (FIG. 3) in decrypted combination 56. In the case of the latter, device 26 will use created digest 55 to remove service provider content usage conditions 52 from decrypted combination 56 to yield combination 48. Once service provider content usage conditions 52 have been removed, owner content usage conditions 38 (FIG. 2) will be verified and/or removed in a similar manner. Specifically, using owner content usage conditions 38, digest 41 is created and is used to verify the integrity of and/or "separate out" owner content usage conditions 38 as digested in combination 48. Once all content usage conditions have been "separated out," title key 34 is recovered. Title key 34 allows encrypted content 36 to be decrypted for display on a television, monitor or the like.

It should be appreciated that in addition to verifying and/or "separating out," device 26 must also follow any content usage conditions received in transmission (if provided). For example, if owner content usage conditions 38 prevented the copying of content 24, and service provider content usage conditions 52 prevented the re-broadcast thereof, device 26 will not be able to either copy or re-broadcast content 24. Moreover, it should also be appreciated that although FIG. 4 depicts the separation of service provider content usage conditions 52 before owner content usage conditions 38, separation could actually occur in any order. In addition, although not shown, consumer 32 (FIG. 1) could be given limited rights to modify (e.g., edit existing or add new) content usage conditions. Such rights could be granted, for example, when device 26 is part of a consumer home network. In a consumer home network, multiple approved devices can be interconnect over a single (e.g., household) network and be permitted to freely share content.

As can be seen from the above description, KMB 12 is instrumental in accessing content 24. Specifically, it is necessary for device 26 to receive and be able to process KMB 12 in order to decrypt content 24. Moreover, given the multiple steps (e.g., title key 34 recovery, digest creation/re-creation, etc.) that may be performed by service provider 30 and/or consumer 32, the speed in which KMB 12 is received and processed is highly relevant. As explained above, the time between receipt of a transmission by device 26 and when the content is decrypted and decoded is known as acquisition time. One example of acquisition time is the delay between when consumer 32 changes the channel and when the content is displayed.

In efficiently transmitting and processing KMB 12, the size thereof is a controlling factor. That is, the larger (e.g., in bytes) the KMB, the longer it will take to transmit and process the KMB. Since KMB 12 contains entries of revoked devices (e.g., revoked device keys), the size of KMB 12 increases as the number of revoked devices increases. At some point, KMB 12 becomes so large that efficient transmission and processing thereof is no longer possible. This leads to increased acquisition times and customer dissatisfaction.

The present invention addresses this problem by generating KMBs based upon a subtree of devices, whereas once a quantity of revoked devices on the subtree exceeds a predetermined threshold (e.g., 10,000), or when a size of a KMB exceeds a predetermined threshold (e.g., 300 bytes), a new subtree will be created. From this point on, any new KMBs that are generated will correspond to the new subtree.

Figure 5:
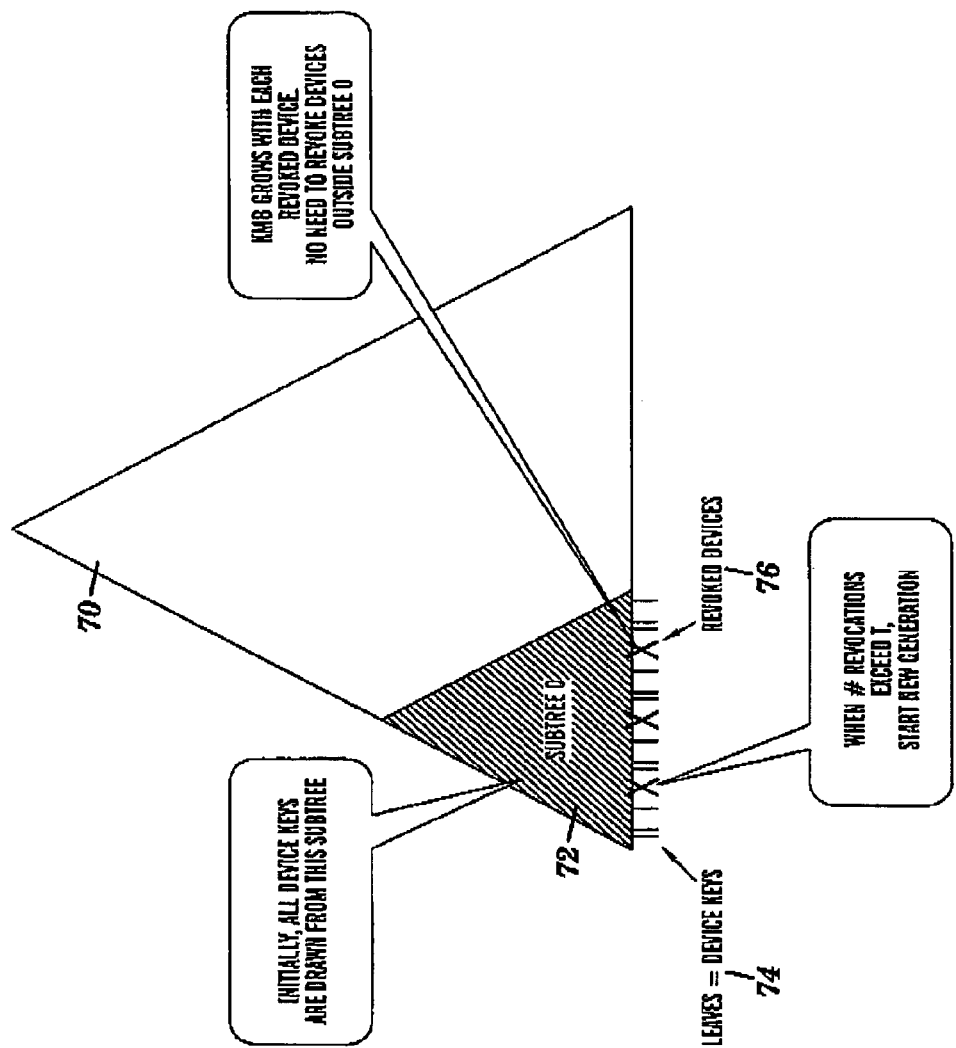
FIG. 5 depicts a first subtree of devices.

Referring now to FIG. 5, the arrangement of devices on a first subtree 72 is shown in greater detail. As depicted, subtree 72 is a division of master tree 70. Each node on first subtree 72 corresponds to a single compliant device 74 or a single revoked device 76. When KMB 12 is created based on first subtree 72, it will include a protected version of key encrypting key 14 that all compliant devices 74 can process. KMB may also contain entries of revoked devices 76. When the size of KMB 12 or the number of revocation entries in KMB 12 exceeds a predetermined threshold, a second subtree will be created. Specifically, since each revoked device must have a corresponding entry in KMB 12 (the entry identifies either an individual device or a group of devices), each revocation will increase the size of KMB 12. Thus, by limiting the number of revocation entries corresponding to devices on first subtree 72, the size of KMB 12 is essentially limited to a predetermined threshold as well.

Figure 6:
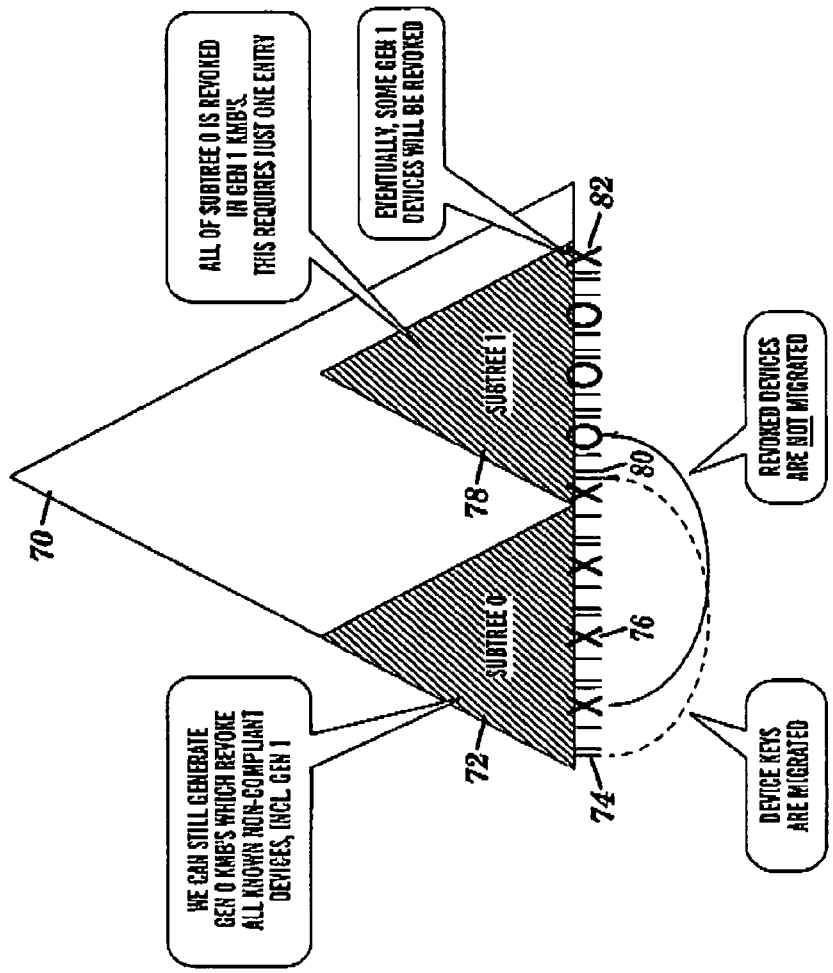
FIG. 6 depicts a second subtree of devices.

Referring now to FIG. 6, second subtree 78 is shown in greater detail. As depicted, second subtree includes nodes that each correspond to a newly added compliant device 80 or a newly revoked device 82. That is, second subtree 78 does not include any revoked devices 76 from first subtree 72. Second subtree 82 will include, however, compliant devices 74 as migrated from first subtree 72 (which will be described in more detail below).

Figure 7:
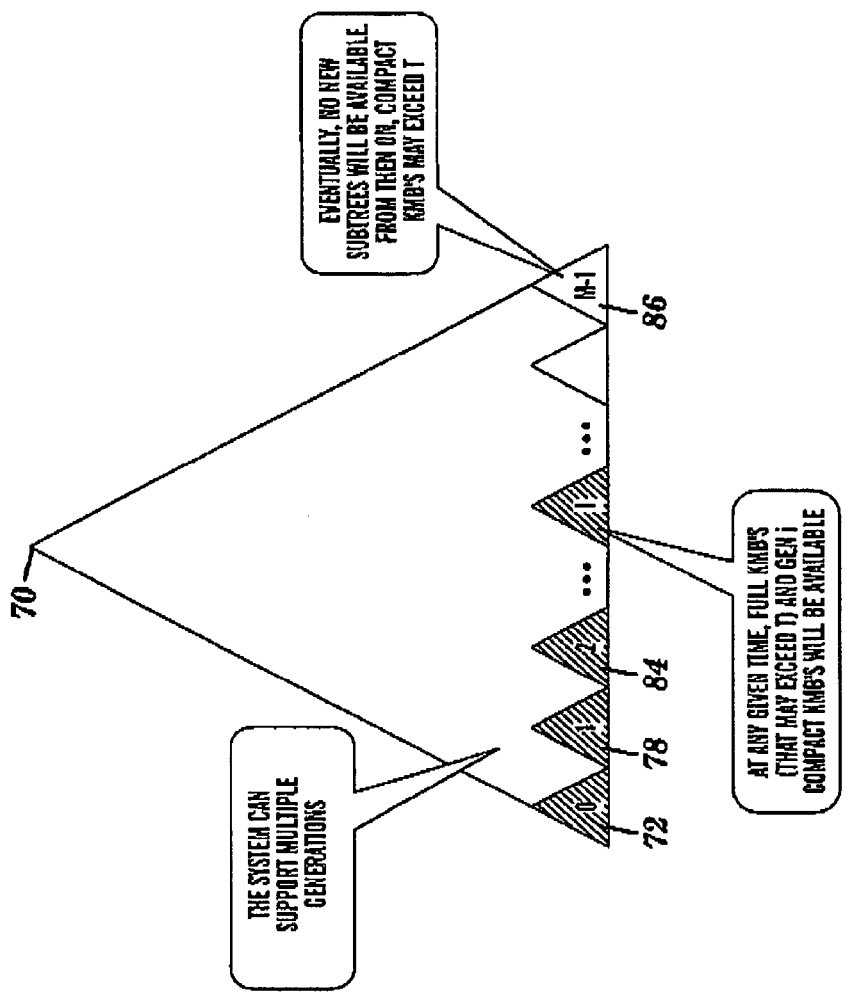
FIG. 7 depicts a Nth level of subtrees of devices.

As shown in FIG. 7, when second subtree 72 comes to include an excessive quantity of revoked devices or when a KMB corresponding to second subtree 72 exceeds a predetermine threshold, a third subtree 84 can be created. This can continue up to the capacity of the master tree 70. Specifically, subtrees can continue to be created until none are available. In this case, the subtree will be permitted to exceed the predetermined threshold. That is, a size of the corresponding KMBs will no longer have to be below a predetermined threshold.

It should be understood that, as indicated above, the present invention is not limited to the use of subtrees. Rather, the teachings of the present invention (including KMB creation) could be based on any substructure that is capable of being revoked with a single entry in a KMB.

Figure 8:
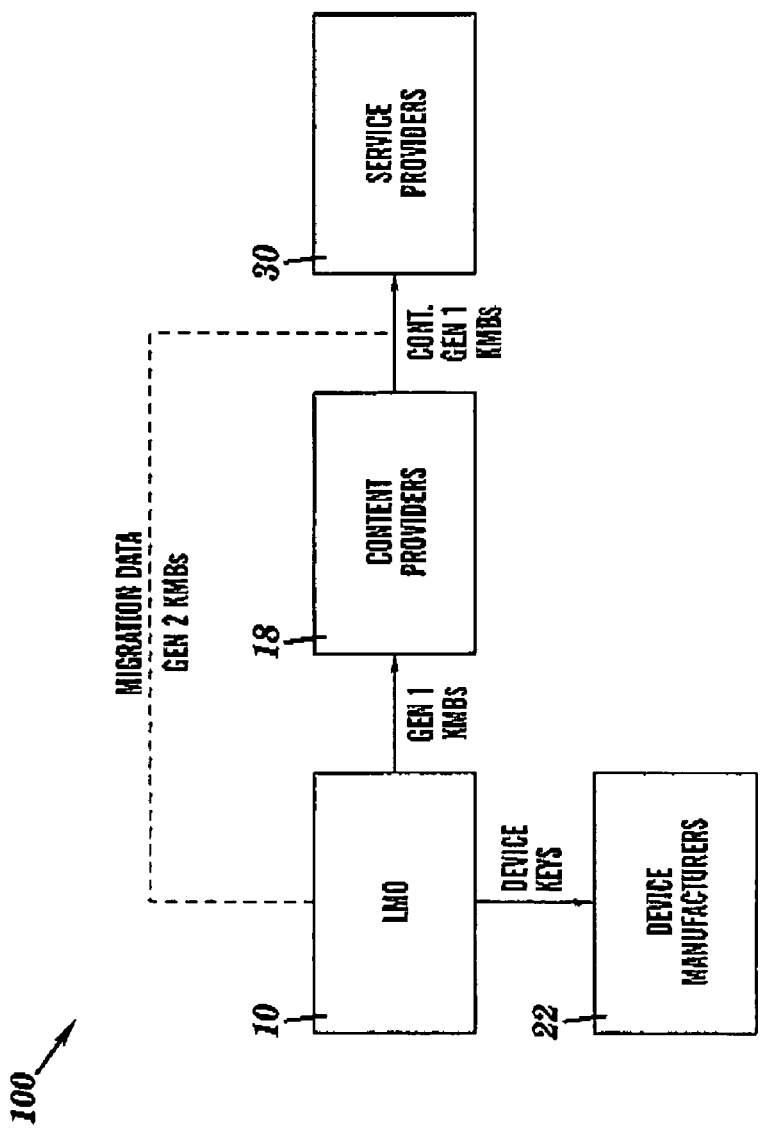
FIG. 8 depicts a process flow diagram, according to the present invention.

Referring now to FIG. 8, a process flow 100 diagram according to the present invention is depicted. As shown (and as described in conjunction with FIG. 1), license management organization 10 generates devices keys for manufacturer 22, and first generation KMBs corresponding to first subtree 72. The first generation KMBs are transmitted to content owner 18, who will encrypt content with title key 34, and then encrypt the title key 34 (or a combination of title key and content usage conditions) with key encrypting key 14 as recovered from the first generation KMB. Owner 18 will then forward the encrypted content, encrypted title key and the first generation KMB to service provider 30. Once received, service provider 30 can, among other things, modify content usage conditions, forward protected content to consumers, etc. Under the present invention, service provider 30 can also elect to receive second generation KMBs. Specifically, service provider 30 can arrange with license management organization 10 to receive second generation KMBs when the first generation KMBs become too large. In a typical embodiment, license management organization 10 begins a new subtree of devices when the quantity of revocation entries in the current subtree, or a size of a KMB corresponding to the current subtree, exceeds a predetermined threshold. Since the second generation subtree will not include any revoked devices from the first generation subtree, the number of revocation entries in KMBs based on the second generation subtree will be greatly reduced. Thus, any KMBs corresponding to the second generation subtree (i.e., second generation KMBs) will be smaller in size. Service provider 30 has the option of receiving this new generation of KMBs or to continue to receive the first generation KMBs. In one embodiment, service provider 30 can elect to receive new generation KMBs as they are generated. This would leave all "decision making" regarding when to commence a new subtree to the license management organization 10. In another embodiment, service provider 30 can elect to receive a new generation of KMBs when a previous generation KMB exceeds a predetermined threshold (set by service provider 30, license management organization 10 or both). In this case, service provider 30 could send a message to license management organization 10 requesting a new generation of KMBs. License management organization 10 would then start a new generation of subtrees and KMBs, if it had not already done so.

In any event, if service provider 30 elects to receive the second generation KMBs, compliant devices must be migrated from the first generation subtree to the second generation subtree before a corresponding second generation KMB can be used. Specifically, in addition to including a protected transformation of a key encrypting key a single entry in the second generation KMB will revoke the entire first generation subtree of devices. That is, the device keys for all devices on the first subtree will not longer be valid. Thus, unless migrated to the second subtree, to which second generation KMBs correspond, the compliant devices from the first subtree will not be able to recover the key encrypting key from the second generation KMB to access the protected content.

Migrating the compliant devices can occur in numerous ways. In a typical embodiment, migrating the devices involves service provider 30 receiving migration data from license management organization 10, and then using the migration data to provide updated device key information to compliant devices. Typically, migration data prepared by license management organization 10 includes a table of entries, with each entry corresponding to one or more devices (e.g., device "A," devices A" and " B," etc.) to be migrated. Each entry will identify: (1) the location of the particular device(s) on the first subtree; (2) updated device key information for the particular device(s); and (3) the location of the particular device(s) on the second subtree. To obtain the location of a device on the second subtree, a mapping must be performed (e.g., by license management organization 10). Such mapping can occur in numerous ways. In one embodiment, each device to be migrated (i.e., compliant device) could be assigned the same location or node on the second subtree that it occupied on the first subtree. For example, if device "A" occupied node "NxY" on the first subtree, it could be assigned to node "NxY" on the second subtree. In another embodiment, the devices to be migrated can be grouped together on the second subtree, regardless of their location on the first subtree. By grouping all migratable devices together, holes will not be left in the second subtree where revoked devices resided on the first subtree (i.e., since revoked devices are not migrated). In any event, once the device locations have been determined, they can be included in the migration data with the updated device key information.

In general, the information communicated to the compliant device comprises the new location (e.g., on the second subtree) and updated device key information as encrypted (otherwise protected) so that only the particular device can decrypt and obtain the updated device keys. This helps dissuade the pirating of the updated device keys during the migration process. Updated device keys are required by the migratable devices because, as indicated above, an entry in the second generation KMBs revoked all devices in the first subtree. Accordingly, the device keys assigned to devices in the first subtree are no longer valid. The updated device keys will allow the compliant device to process the new KMB to recover the new key encrypting key therein. Without the new device key information, the device would not be able to determine the new key encrypting key and thus, could not decrypt the title key to access the content. Once the devices have received their respective updated device key information, migration is complete.

It should be understood that transmission of the updated device key information to the devices can occur in any number of ways, and the present invention is not intended to be limited to any single method. In a first embodiment, the updated device key information could be transmitted the next time a device establishes a connection to the service provider for re-provisioning. In this scenario, the service provider can indicate to the device that it must be migrated (i.e., re-keyed). The device would then send a message back to the service provider that includes its location on the now revoked first subtree. The service provider can then reference the table in the migration data and use the first subtree location provided by the device to identify the pertinent entry. Once identified, the updated key information and second subtree location from the entry will be transmitted back to the device. The device can then decrypt the information to obtain its new device keys and remember its location on the second subtree. In another embodiment, service providers may allocate some bandwidth, for example, as part of a "control" channel, and repeatedly transmit the migration data. Devices must tune into the control channel and wait for the entry associated with its current location (i.e., on the first subtree). Once identified, the device will obtain the corresponding updated device keys and location (i.e., on the second subtree). In any event, several variations of these embodiment are also possible. For example, service provider 30 may know the first subtree locations of all devices corresponding to active subscribers, and may filter the entries in the migration data so that only the relevant entries are stored. Alternatively, a third party may store the migration data and provide online access in response to queries (e.g., from service providers or subscriber devices) that provide a subtree location. Regardless of how the information is communicated to the devices, it should be understood that only migrated devices will be able to process both first and second generation KMBs.

One possible implementation of the migration scheme described above is as follows. A master tree having a height of 31 levels will allow for approximately 2 billion nodes (devices). To reduce the size of the device key set that each device must store, it is possible to truncate the tree at the expense of slightly bigger KMBs. Truncating eight levels down from the top reduces the device key size roughly from 500 to 250 keys. Although this truncation would define 256 subtrees, these subtrees have nothing to do with the subtrees that are the subject of the present invention. For example, in this master tree, there can be 16 generations or subtrees. Each subtree can support 130 million devices. The migration data described above would require approximately 130 million entries each using approximately 260 keys.

As explained above, migration of device can be accomplished in many ways. The embodiment described above is intended to by exemplary of one such way. In another embodiment, service provider 30 is granted access to the root of the tree from which all scheme "secrets" can be generated. Under this embodiment, no information other than a representation (e.g., a list) of the mapping from first subtree 72 to second subtree 78 needs to be sent to service provider 30. Although this embodiment may make security of the secrets more difficult, it reduces the information (migration data) that service provider 30 must receive and process.

In addition to migrating compliant devices from the first subtree, service provider 30 (or a third party) can also re-encrypt the title key. Re-encryption is necessary when the second generation KMB includes a new key encrypting key. To re-encrypt the title key, service provider 30 will recover the first generation key encrypting key from a first generation KMB using a service provider key (as obtained from license management organization 10). Once recovered, the title key (or title key-content usage conditions combination) will be decrypted. Then, service provider 30 will recover the second generation key encrypting key from the second generation KMB received directly from license management organization 10. Once recovered, the second generation key encrypting key will be used to re-encrypt the title key. From this point on, devices receiving communications from service provider 30 must use the second generation key encrypting key to access the content.

It should be understood that the elements of FIGS. 1–8 used to manage a size of a KMB can be implemented as hardware, software or as a combination of hardware or software. As such, any kind of computer/server system(s)— or other apparatus adapted for carrying out the methods described herein—is suited. A typical combination of hardware and software could be a general purpose (computer) system with a computer program that, when loaded and executed, carries out the methods described herein. Alternatively, a specific use (computer) system, containing specialized hardware for carrying out one or more of the functional tasks of the invention could be utilized. The present invention can also be embedded in a computer program product, which comprises all the features enabling the implementation of the methods described herein, and which—when loaded in a (computer) system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 9:
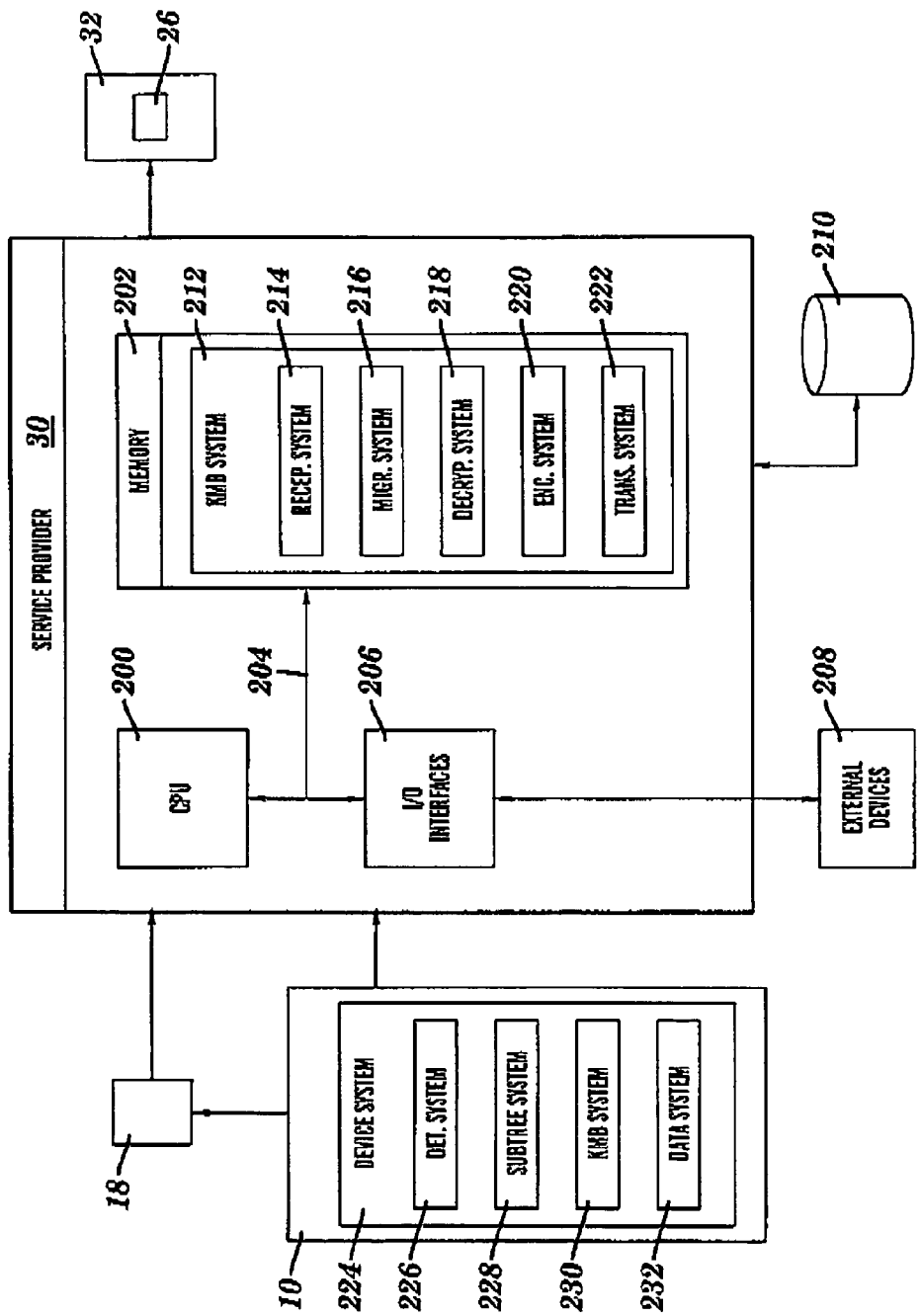
FIG. 9 depicts a computer system implementation of the present invention.

Referring now to FIG. 9, an exemplary computerized implementation of the present invention is shown. As described above, license management organization 10 communicates with both content owner 18 and service provider 30. Service provider 30 communicates received transmissions to consumer 32. As shown, service provider 30 generally comprises central processing unit (CPU) 200, memory 202, bus 204, input/output (I/O) interfaces 206, external devices/resources 208 and database 210. Memory 202 may comprise any known type of data storage and/or transmission media, including magnetic media, optical media, random access memory (RAM), read-only memory (ROM), a data cache, a data object, etc. Moreover, memory 202 may reside at a single physical location, comprising one or more types of data storage, or be distributed across a plurality of physical systems in various forms. CPU 200 may likewise comprise a single processing unit, or be distributed across one or more processing units in one or more locations, e.g., on a client and server.

I/O interfaces 206 may comprise any system for exchanging information from an external source. External devices 208 may comprise any known type of external device, including speakers, a CRT, LED screen, hand-held device, keyboard, mouse, voice recognition system, speech output system, printer, monitor, facsimile, pager, etc. Bus 204 provides a communication link between each of the components in the service provider 30 and likewise may comprise any known type of transmission link, including electrical, optical, wireless, etc. In addition, although not shown, additional components, such as cache memory, communication systems, system software, etc., may be incorporated into service provider 30.

Database 210 may provide storage for information necessary to carry out the present invention such as a KMBs, subscriber information, etc. As such, database 210 may include one or more storage devices, such as a magnetic disk drive or an optical disk drive. In another embodiment, database 210 includes data distributed across, for example, a local area network (LAN), wide area network (WAN) or a storage area network (SAN) (not shown). Database 210 may also be configured in such a way that one of ordinary skill in the art may interpret it to include one or more storage devices.

It should be understood that although not shown in FIG. 9 license management organization 10, content owner 18 and consumer 32 could also include similar computer components. Such components have not been shown for brevity purposes.

Stored in memory 202 of service provider 30 is KMB system 212, which includes reception system 214, migration system 216, decryption system 218, encryption system 220 and transmission system 222. As described above, a first generation KMB is created based upon a first generation subtree by license management organization 10. The first generation KMB is transmitted to content owner 18 who will encrypt content with a title key and then encrypt the title key with a key encrypting key as recovered from the first generation KMB. Content owner will then forward the encrypted content and the first generation KMB (as well as any content usage conditions) to service provider 30, who will receive the same via reception system 214.

Once received, service provider 30 can forward the protected content and the first generation KMB to subscribing consumer 32. If, however, it is determined that the first generation subtree has a quantity of revoked devices greater than a predetermined threshold, or that the first generation KMB has a size greater than a predetermined threshold, a second generation subtree can be created. As shown in FIG. 9, this functionality can be provided by device system 224 within license management organization 10. Specifically, license management organization 10 includes device system 224, which comprises determination system 226, subtree system 228, KMB system 230 and data system 232. Determination system 226 will determine whether any threshold is exceeded. If so, subtree system 228 will create a second generation subtree based upon which second generation KMBs will be created and transmitted to service provider 30. These second generation KMBs will include a single entry revoking all devices in the first generation subtree. That is, all device keys for devices on the first generation subtree will be revoked and cannot be used to recover the key encrypting key from the second generation KMBs. Accordingly, any devices on the first generation subtree that are still compliant must be migrated to the second generation subtree to be able to access encrypted content.

It should be understood that although not shown, other variations for performing the functions described herein could be provided. For example, instead of license management organization 10, service provider 30 could be provided with a system for determining whether a size of the first generation KMB is greater than a predetermined threshold. As such, it is not essential which party determines that a second generation subtree and/or KMB is needed.

As indicated above, migrating devices includes service provider 30 receiving migration data from license management organization 10, and updating device key information for consumer 32. The relevant migration data is assembled by license management organization 10 via data system 232. Such data includes a table of entries that each correspond to a device to be migrated. Each entry will identify updated device keys, a first generation subtree location and a second generation subtree location for a particular device. In determining the second generation subtree location for a device, a mapping must be performed. As described above, the mapping can be performed by assigning the device the same location on the second generation subtree that it occupied on the first generation subtree. Alternatively, mapping could be performed by grouping all migratable devices together on the second generation subtree.

Once migration data has been assembled, service provider 30 will receive the same via reception system 214. At this point migration system 216 will process the data and perform the migration. That is, service provider 30 will communicate to consumer 32, via transmission system 222, the consumer's new device key information and its location on the second generation subtree. In addition, since the second generation KMB might have a different key encrypting key, re-encryption of the title keys used to encrypt the underlying content might be necessary. In this case, decryption system 218 would process the first generation KMB (as stored in database 210) to recover the first key encrypting key and decrypt the title key. Then, by recovering the new key encrypting key from the second generation KMB directly received from license management organization 10, the title key would be re-encrypted (e.g., via encryption system 220). At this point, the first generation KMB is no longer relevant and can be discarded. Service provider 30 can then transmit the encrypted content, the re-encrypted title key and the second generation KMB to consumer 32 who will use its updated device keys to recover the new key encrypting key from the second generation KMB. It should be understood that the re-encrypting of title keys can be performed by any entity. Re-encryption is shown as being performed by service provider 30 for illustrative purposes only.

The present invention provides a method, system and program product for managing a size of a KMB during content distribution. The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for managing a size of a key management block (KMB) during content distribution, comprising the steps of:
   providing a first KMB corresponding to a first substructure, and content encrypted with a title key;
   determining whether a size of the first KMB exceeds a predetermined threshold;
   providing, in response to a determination that the size of the first KMB exceeds the predetermined threshold, a second KMB corresponding to a second substructure, wherein the second KMB includes an entry revoking the first substructure; and
   migrating compliant devices from the first substructure to the second substructure.

2. The method of claim 1, wherein the title key is encrypted with a first key encrypting key that is protected within the first KMB.

3. The method of claim 2, further comprising the steps of:
   decrypting the encrypted title key with the first key encrypting key as recovered from the first KMB; and
   re-encrypting the title key with the second key encrypting key as recovered from the second KMB.

4. The method of claim 1, wherein the migrating step comprises the steps of:
   receiving migration data that includes updated device key information;
   transmitting the updated device key information to a device; and
   the device implementing the updated device key information.

5. The method of claim 4, wherein the migration data comprises entries that correspond to compliant devices to be migrated from the first substructure to the second substructure, and wherein each entry identifies a location of at least one compliant device on the first substructure and updated device key information for the at least one compliant device.

6. The method of claim 4, wherein the migration data is received by a content service provider from a license management organization.

7. A method for managing a size of a key management block (KMB) during content distribution, comprising the steps of:
   providing a first KMB corresponding to a first subtree of devices, and content encrypted with a title key, wherein the title key is encrypted with a first key encrypting key that is protected within the first KMB;
   determining whether a size of the first KMB exceeds a predetermined threshold;
   providing, in response to a determination that the size of the first KMB exceeds the predetermined threshold, a second KMB corresponding to a second subtree of devices, wherein the second KMB includes an entry revoking the first subtree of devices, and wherein the second KMB is smaller than the first KMB;
   migrating compliant devices from the first subtree of devices to the second subtree of devices; and re-encrypting the title key with a second key encrypting key as recovered from the second KMB.

8. The method of claim 7, further comprising the step of decrypting the encrypted title key with the first key encrypting key as recovered from the first KMB prior to the re-encrypting step.

9. The method of claim 7, wherein the migrating step comprises the steps of:
receiving migration data that includes updated device key information;
transmitting the updated device key information to a device; and
the device implementing the updated device key information.

10. The method of claim 9, wherein the migration data comprises entries that correspond to compliant devices to be migrated from the first subtree of devices to the second subtree of devices, and wherein each entry identifies a location of at least one compliant device on the first subtree of devices and updated device key information for the at least one compliant device.

11. A system for managing a size of a key management block (KMB) during content distribution, comprising:
a system for receiving a first KMB corresponding to a first subtree of devices, and content encrypted with a title key;
a system for determining whether a size of the first KMB exceeds a predetermined threshold;
a system for receiving, in response to a determination that the size of the first KMB exceeds the predetermined threshold, a second KMB corresponding to a second subtree of devices, wherein the second KMB is smaller than the first KMB, and wherein the second KMB includes an entry revoking the first subtree of devices; and
a system for migrating compliant devices from the first subtree of devices to the second subtree of devices based on migration data.

12. The system of claim 11, further comprising:
a system for decrypting an encrypted title key with a first key encrypting key as recovered from the first KMB; and
a system for re-encrypting the title key with a second key encrypting key as recovered from the second KMB.

13. The system of claim 11 further comprising:
a system for mapping the complaint devices on the first subtree of devices to the second subtree of devices.

14. The system of claim 11, wherein the system for migrating comprises:
a system for receiving migration data that includes updated device key information; and
a system for transmitting the updated device key information to a device.

15. The system of claim 14, wherein the migration data comprises entries that correspond to compliant devices to be migrated from the first subtree of devices to the second subtree of devices, and wherein each entry identifies a location of at least one compliant device on the first subtree of devices and updated device key information for the at least one compliant device.

16. A program product stored on a recordable medium for managing a size of a key management block (KMB) during content distribution, which when executed, comprises:
program code for receiving a first KMB corresponding to a first subtree of devices, and content encrypted with a title key;
program code for determining whether a size of the first KMB exceeds a predetermined threshold;
program code for receiving, in response to a determination that the size of the first KMB exceeds the predetermined threshold, a second KMB corresponding to a second subtree of devices, wherein the second KMB is smaller than the first KMB, and wherein the second KMB includes an entry revoking the first subtree of devices; and
program code for migrating compliant devices from the first subtree of devices to the second subtree of devices based on migration data.

17. The program product of claim 16, further comprising:
program code for decrypting an encrypted title key with a first key encrypting key as recovered from the first KMB; and
program code for re-encrypting the title key with a second key encrypting key as recovered from the second KMB.

18. The program product of claim 16 further comprising:
program code for mapping the complaint devices on the first subtree of devices to the second subtree of devices.

19. The program product of claim 16, wherein the system for migrating comprises:
program code for receiving migration data that includes updated device key information; and
program code for transmitting the updated device key information to a device.

20. The program product of claim 19, wherein the migration data comprises entries that correspond to compliant devices to be migrated from the first subtree of devices to the second subtree of devices, and wherein each entry identifies a location of at least one compliant device on the first subtree of devices and updated device key information for the at least one compliant device.

* * * * *

UNITED STATES PATENT AND TRADEMARK OFFICE
CERTIFICATE OF CORRECTION

PATENT NO. : 7,092,527 B2 Page 1 of 1
APPLICATION NO. : 10/125254
DATED : August 15, 2006
INVENTOR(S) : Foster et al.

It is certified that error appears in the above-identified patent and that said Letters Patent is hereby corrected as shown below:

On Title Page Item 57 under ABSTRACT, line 10, please remove "KMD" and insert --KMB--.

Signed and Sealed this

Twenty-first Day of November, 2006

JON W. DUDAS
*Director of the United States Patent and Trademark Office*